(12) United States Patent
Bai et al.

(10) Patent No.: US 11,525,079 B1
(45) Date of Patent: Dec. 13, 2022

(54) PREPARATION METHOD OF FULLY ADAPTIVE MODIFIED NANOGRAPHENE PLUGGING TYPE ANTI-COLLAPSE DRILLING FLUID AND USE THEREOF

(71) Applicant: Southwest Petroleum University, Chengdu (CN)

(72) Inventors: Yang Bai, Chengdu (CN); Dezhi Liu, Chengdu (CN); Jing Zhang, Chengdu (CN); Pingya Luo, Chengdu (CN); Gang Xie, Chengdu (CN); Feng Dai, Chengdu (CN); Wenzhe Li, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/675,389

(22) Filed: Feb. 18, 2022

(30) Foreign Application Priority Data

Dec. 9, 2021 (CN) .......................... 202111501327.3

(51) Int. Cl.
*C09K 8/504* (2006.01)
*C01B 32/194* (2017.01)

(52) U.S. Cl.
CPC .......... *C09K 8/5045* (2013.01); *C01B 32/194* (2017.08); *C09K 2208/10* (2013.01)

(58) Field of Classification Search
CPC .............. C09K 8/5045; C09K 2208/10; C01B 32/194; C01B 32/182; C01B 32/184; C01B 32/186; C01B 32/188; C01B 32/19; C01B 32/192; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23
See application file for complete search history.

(56) References Cited

U.S. PATENT DOCUMENTS

| | | | | |
|---|---|---|---|---|
| 2014/0079932 A1* | 3/2014 | Aksay | .................. | B82Y 30/00 428/220 |
| 2014/0272938 A1* | 9/2014 | Loo | ........................ | C12Q 1/04 435/7.1 |
| 2014/0367091 A1* | 12/2014 | Tour | ....................... | E21B 47/12 166/305.1 |

FOREIGN PATENT DOCUMENTS

| CN | 101765560 A | 6/2010 |
|---|---|---|
| CN | 103936000 A | 7/2014 |
| CN | 113637464 A | 11/2021 |

OTHER PUBLICATIONS

Bianco, et al., All in the graphene family—A recommended nomenclature for two-dimensional carbon materials, Carbon 2013; 65: 1-6 (Year: 2013).*
Jankovsky, et al., Concentration of Nitric Acid Strongly Influences Chemical Composition of Graphite Oxide, Chem. Eur. J. 2017; 23 : 6432-6440 (Year: 2017).*
Poh, et al., Graphenes prepared by Staudenmaier, Hofmann and Hummers methods with consequent thermal exfoliation exhibit very different electrochemical properties, Nanoscale 2012; 4: 3515-3522 (Year: 2012).*
Eigler, et al., Wet Chemical Synthesis of Graphene, Adv. Mater. 2013; 25: 3583-3587 (Year: 2013).*
Talyzin, et al., Brodie vs. Hummers graphite oxides for preparation of multi-layered materials, Carbon 2017; 115: 430-440 (Year: 2017).*
Tyurnina, et al., Ultrasonic exfoliation of graphene in water: A key parameter study, Carbon 2020; 168: 737-747 (Year: 2020).*
Hao et al., "Mechanism of blocking mud shale on Longmaxi formation by graphene oxide", Fine Chemicals, vol. 37, No. 5, pp. 1038-1044, May 2020 (7 pages total).

* cited by examiner

*Primary Examiner* — Daniel C. McCracken
(74) *Attorney, Agent, or Firm* — Sughrue Mion, PLLC

(57) ABSTRACT

A preparation method of a fully adaptive modified nanographene plugging type anti-collapse drilling fluid is disclosed. A modified nanographene slurry anti-collapse agent and a water-based drilling fluid containing the modified nanographene slurry anti-collapse agent are disclosed. The preparation method includes subjecting a nanographene and a mixed acid to a first contact to obtain a mixed liquid, dropwise adding potassium chlorate into the mixed liquid under the condition of ice-bath pan to carry out a modification treatment, so as to obtain a modified nanographene, and subjecting the modified nanographene to a second contact with water to prepare a modified nanographene slurry.

6 Claims, No Drawings

PREPARATION METHOD OF FULLY ADAPTIVE MODIFIED NANOGRAPHENE PLUGGING TYPE ANTI-COLLAPSE DRILLING FLUID AND USE THEREOF

CROSS REFERENCE TO RELATED APPLICATIONS

The application claims priority to Chinese Application No. 202111501327.3, filed on Dec. 9, 2021, entitled "a preparation method of fully adaptive modified nanographene plugging type anti-collapse drilling fluid and use thereof", which is herein specifically and entirely incorporated by reference.

FIELD

The present disclosure relates to the field of drilling fluids, and in particular to a preparation method of fully adaptive modified nanographene plugging type anti-collapse drilling fluid and use thereof.

BACKGROUND

The existing techniques for preventing collapse of borehole walls in water-based drilling fluids have two aspects of chemical inhibition and physical plugging. Although the hydration and swelling of a portion of stratum can be solved by adding an inhibitor, so as to prevent an occurrence of the accident such as borehole wall collapse, the existing inhibitors are usually toxic and environmentally unfriendly, and may change the density and rheology of the drilling fluid system and influence the drilling rate. Basalt has a weak water sensitivity but contains many micro-fractures, it has a hard and brittle lithology and is susceptible to structural damage by external forces such as mechanical vibrations. The mechanism of borehole instability is mechanical instability, requiring a strong plugging capability of the drilling fluid and increasing the pressure bearing capacity of the whole wellbore according to the "stress cage" theory, thereby preventing the drilling process from fall-block, borehole collapse and other problem.

The average particle size and shape of the current plugging material are difficult to match with those of the micro-nano fractures, on the other hand, the entrance of moisture cannot be favorably plugged merely by means of the characteristics of the nanometer material itself having a very small average particle size, thus the dispersion and stability of the existing nanometer material are difficult to satisfy the plugging requirements of the basalt formation.

Accordingly, it has important significance to research and develop an anti-collapse agent.

SUMMARY

The purpose of the present disclosure is to overcome the defective problems in the prior art that the drilling fluids have poor plugging effect on the microfracture pores developed in basalt, and provide a preparation method of a fully adaptive modified nanographene plugging type anti-collapse drilling fluid and use thereof, the drilling fluid is capable of comprehensively plugging the basal borehole wall micro-nano pores and cracks.

In order to fulfill the above purpose, a first aspect of the present disclosure provides a method of preparing a modified nanographene slurry anti-collapse agent, including:

(1) subjecting a nanographene and a mixed acid to a first contact to obtain a mixed liquid;

(2) dropwise adding potassium chlorate into the mixed liquid under the condition of ice-bath pan to carry out a modification treatment, so as to obtain a modified nanographene;

(3) subjecting the modified nanographene to a second contact with water to prepare a modified nanographene slurry.

In a second aspect, the present disclosure provides a modified nanographene slurry anti-collapse agent produced with the aforementioned method.

In a third aspect, the present disclosure provides a water-based drilling fluid, comprising the aforesaid modified nanographene slurry anti-collapse agent, a micron plugging agent and a weighting agent.

In a fourth aspect, the present disclosure provides a use of the aforesaid water-based drilling fluid in microfracture pores developed in basalt.

Due to the above-mentioned technical schemes, the anti-collapse water-based drilling fluid provided by the present disclosure has the following advantages over the existing water-based drilling fluid system during the process of drilling basalt:

(1) high plugging capability. The particles having different average particle sizes are sufficiently cooperative, even when drilling a formation of basalt with development of micro-nano fractures, there is not the problem of incomplete plugging due to the absence of particles with a certain average particle size range in the drilling fluid system.

(2) the drilling fluid system is environmentally friendly with less toxicity, wherein the plugging agent and the anti-collapse agent are non-toxic, and are soluble in an acid, can act as a reservoir protective agent without affecting the proceeding of the well logging operations.

(3) the drilling fluid has strong suspension stability, and will not cause the circumstances that the pumping and circulation are stopped during the drilling process and a large amount of solid phase deposits and accumulates. The drilling fluid has strong capability of suspending and carrying the rock debris during circulation.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides a method of preparing a modified nanographene slurry anti-collapse agent, including:

(1) subjecting a nanographene and a mixed acid to a first contact to obtain a mixed liquid;

(2) dropwise adding potassium chlorate into the mixed liquid under the condition of ice-bath pan to carry out a modification treatment, so as to obtain a modified nanographene;

(3) subjecting the modified nanographene to a second contact with water to prepare a modified nanographene slurry.

The inventors of the present disclosure have surprisingly discovered that, on the one hand, a nanographene is contacted with a mixed acid which can provide strong oxidizing property and acidic conditions; potassium chloride, as a strong oxidizing agent, can oxidize the nanographene surface to obtain better dispersibility; on the other hand, the reaction can be performed more sufficiently by means of dropwise adding manner which is safer; furthermore, the prepared modified nanographene is diluted with water in order to prevent agglomeration of the modified nanographene and obtain a desirable dispersibility; as a result, the modified nanographene slurry anti-collapse agent is prepared by modifying the nanographene, it can effectively enhance dispersibility of nanographene to prevent agglomeration of nanoparticles.

Further, the prepared novel nanometer anti-collapse agents (the modified nanographene) are used in combination with the micron plugging agent to create a comprehensively plugging type drilling fluid system, and comprehensively plug the microfracture pores developed in basalt by using the "grading" principle; when drilling a formation of basalt with micro-nano fractures, the barite having a large average particle size bridges to form a stress network, the micron plugging agent having a small average particle size fills up the gaps, and the particles of nanometer anti-collapse agent subsequently fill, so as to comprehensively plug the basalt borehole wall micro-nano pores and cracks, the particles are squeezed for each other and coupled tightly, thereby enhancing the pressure bearing capability of the borehole wall.

Furthermore, the structure of the modified nanographene per se has a lubrication effect, the modified nanographene can improve the mud cake quality and reduce damage of the drilling rig to the borehole wall and prevent the occurrence of accidents such as borehole instability, collapse and fall-block during the drilling process. The water-based drilling fluid of the present disclosure can solve the problem in the prior art concerning poor pressure bearing capability of borehole wall, collapse, fall-block and borehole instability of the drilling fluids when drilling the basalt formations.

According to the present disclosure, the mixed acid in step (1) is a compound of concentrated sulfuric acid and concentrated nitric acid, a mass ratio of the used amount of the concentrated sulfuric acid to the concentrated nitric acid is (1-2):(2-5); preferably, a mass ratio of the used amount of the concentrated sulfuric acid to the concentrated nitric acid is (1-1.5):(2-3); more preferably, a mass ratio of the used amount of the concentrated sulfuric acid to the concentrated nitric acid is (1):(1-3). A use of the compound of concentrated sulfuric acid and the concentrated nitric acid in the present disclosure can produce the optimum oxidation and modification effects.

According to the present disclosure, the nanographene is used in an amount of 1-10 g, preferably 2-8 g, more preferably 2.5-7.5 g, relative to 100 mL of the said mixed acid;

According to the present disclosure, the conditions of the said first contact comprises a time of 20-30 min, preferably 20-25 min.

According to the present disclosure, the condition of dropwise adding in step (2) comprises a dropwise adding rate of 5-10 g/5-10 min, preferably 6-8 g/5-10 min, more preferably 5-8 g/6-8 min, and further more preferably 1 g/min. In the present disclosure, the reaction is performed more sufficiently by using the "dropwise adding" manner, which is safer.

According to the present disclosure, the potassium chloride is used in an amount of 50-100 g, preferably 60-80 g, relative to 100 mL of the mixed acid; the present application uses potassium chloride as a strong oxidizing agent, which can oxidize the graphene surface thereby producing the better dispersibility.

According to the present disclosure, the ice-bath pan comprises a mixture of ice and water, the mixture of ice and water preferably has a solid content greater than 50%, more preferably 50-60%.

According to the present disclosure, the modification treatment condition includes: the treatment is continuously performed under the room temperature of 10-35° C. for 80-110 h after natural melting of the ice block in the ice-bath pan; the modification treatment condition preferably comprises a temperature of 10-30° C. and a time of 84-108 hours; more preferably comprises a temperature of 18-20° C. and a time of 90-102 hours.

According to the present disclosure, the method further comprises: subjecting the modified nanographene obtained in step (2) to centrifugation and washing to neutral, and subjecting to an airtight ultrasonic dispersion exfoliation treatment.

According to the present disclosure, the centrifugation condition includes a centrifugation rotational speed of 5,000 r/min to 20,000 r/min and a time of 20-40 min.

According to the present disclosure, the airtight ultrasonic dispersion exfoliation conditions comprises a temperature of 60-100° C., an ultrasonic frequency of 3-4 MHz, and a time of 40-80 min, preferably a temperature of 80-90° C., an ultrasonic frequency of 3.5-4 MHz, and a time of 60-80 min.

According to the present disclosure, the modified nanographene in step (3) is used in an amount of 10-15 g, preferably 10-12 g, relative to 100 mL of water According to a particularly preferred embodiment of the present disclosure, a method of preparing a modified nanographene slurry anti-collapse agent comprises the following steps:

(S1) formulating a mixed acid L1 consisting of concentrated sulfuric acid and concentrated nitric acid according to a suitable ratio;

(S2) weighting a nanographene in parts by mass and dispersing the nanographene in the mixed acid L1 to obtain a mixed liquid L2;

(S3) transferring the mixed liquid L2 into an ice-bath pan reactor, dropwise adding potassium chlorate into the mixed liquid L2 to obtain a mixed liquid L3;

(S4) continuously carrying out reaction at room temperature after the natural melting of ice block in the ice-bath pan;

(S5) subjecting the mixed liquid L3 to a repeated centrifugation process with the deionized water to neutrality, and performing the airtight ultrasonic dispersion exfoliation to obtain a modified nanographene L4;

(S6) diluting the modified nanographene L4 with water to obtain a modified nanographene slurry.

According to the present disclosure, wherein the solvent in the step (S1) is a mixed acid consisting of concentrated sulfuric acid and concentrated nitric acid. Preferably, the mass ratio of the concentrated sulfuric acid to the concentrated nitric acid is 1:(1-3); in the step (S2), the parts by weight of used nanographene is 2.5-7.5 g with respect to 100 mL of the solvent; in the step (S3), the modifying condition comprises dropwise adding potassium chlorate into the mixed liquid at a certain rate under the ice-bath condition, the dropwise adding rate is 5-8 g/6-8 min; the cumulative dosage of potassium chlorate is 60-80 g relative to 100 parts by weight of the mixed acid, and the time of adding operation is controlled to be within a range of 60-80 min; in the step (S4), the reacting condition is that the solid content of the mixture of ice of water added into the ice-bath pan is 50-60%, and the reaction is continuously performed at 18-20° C. for 90-102 h after the ice blocks in the ice-bath pan are naturally melted; in the step (S5), the centrifugation rotational speed is within a range of 5,000 r/min to 20,000 r/min; and in the step (S6), the airtight ultrasonic exfoliation conditions comprises a temperature of 80-90° C., an ultrasonic frequency of 3.5-4 MHz, and a time of 60-80 min.

In a second aspect, the present disclosure provides a modified nanographene slurry anti-collapse agent produced with the aforementioned preparation method.

According to the present disclosure, the modified nanographene has an average particle size of 40-100 nm, preferably 60-100 nm.

In the present disclosure, the modified nanographene slurry is a black liquid, and the modified nanographene slurry comprises modified nanographene and water, the modified nanographene is used in an amount of 10-15 g, preferably 10 to 12 g, relative to 100 mL of water.

In the present disclosure, it is preferable that the modified nanographene slurry anti-collagen agent is a modified nanographene slurry with a solid content of 10-12%, and dispersing agent is water. The modified nanographene prepared with the method can prevent agglomeration of particles and effectively fill the micro-nano pores and cracks; on the one hand, the modified nanographene plugs the free water and blocks its entrance into the stratum to cause borehole wall instability; on the other hand, the graphene particles are embedded into the micro-nano cracks to enhance the borehole stress and prevent occurrence of collapse and fall-block of borehole wall.

In a third aspect, the present disclosure provides a water-based drilling fluid, comprising the aforesaid modified nanographene slurry anti-collapse agent, a micron plugging agent and a weighting agent.

According to the present disclosure, the micron plugging agent has an average particle size distribution of 1-25 µm, preferably 2-5 µm; the weighting agent has an average particle size of 2-20 µm, preferably 12-20 µm.

In the present disclosure, when drilling a formation of basalt with micro-nano fractures, the barite having a large average particle size bridges to form a stress network, the micron plugging agent having a small average particle size fills up the gaps, and the particles of nanometer anti-collapse agent subsequently fill, so as to comprehensively plug the basalt borehole wall micro-nano pores and cracks, the particles are squeezed for each other and coupled tightly, thereby enhancing the pressure bearing capability of the borehole wall. The structure of modified nanographene per se has a lubrication effect, the nanographene can improve the mud cake quality and reduce damage of the drilling rig to the borehole wall and prevent the occurrence of accidents such as borehole instability, collapse and fall-block during the drilling process.

According to the present disclosure, the modified nanographene slurry anti-collapse agent is used in an amount of 1-10 parts by weight, the micron plugging agent is used in an amount of 1-10 parts by weight, and the weighting agent is used in an amount of 100-150 parts by weight, relative to 100 parts by weight of water; preferably, the modified nanographene slurry anti-collapse agent is used in an amount of 1-5 parts by weight, the micron plugging agent is used in an amount of 1-5 parts by weight, and the weighting agent is used in an amount of 120-150 parts by weight, relative to 100 parts by weight of water. In the present disclosure, the contents of the said components are defined within the aforementioned ranges to satisfy the better rheology of the drilling fluid, the various contents of particles are tightly coupled by reasonable compounding and grading of particle sizes, so as to improve the plugging and anti-collapse capability of the drilling fluid composition, to reduce the possibility of borehole wall collapse during the drilling process.

In accordance with the present disclosure, the micron plugging agent is ultrafine calcium carbonate powder XNZD, wherein the main component of the ultrafine calcium carbonate powder XNZD is ultrafine calcium carbonate powder, which is characterized by high purity, complete solubility in an acid, and can play a role of plugging and increasing weight, and it can be used in the drilling fluids, reservoir-specific completion fluids, and workover fluid.

According to the present disclosure, the weighting agent is barite, wherein barite is an ultrafine barium sulfate powder used for increasing density of drilling fluids, it is widely used in all drilling fluid systems, and meets the International Standard API13A (American Petroleum Institute 13A), it is an inert material that will not react with other products and does not affect the chemical characteristics of the drilling fluid system, and can increase the density of water-based or oil-based drilling fluids to 22 ppg (pounds-per-gallon).

According to the present disclosure, the water-based drilling fluid further comprises one or more selected from the group consisting of bentonite, potassium chloride, an alkalinity modifier, a fluid-loss agent and a coating agent; preferably, the water-based drilling fluid further comprises bentonite, potassium chloride, an alkalinity modifier, a fluid-loss agent and a coating agent.

According to the present disclosure, the bentonite is used in an amount of 2-6 parts by weight, the potassium chloride is used in an amount of 0.1-10 parts by weight, the alkalinity modifier is used in an amount of 0.1-1 parts by weight, the fluid-loss agent is used in an amount of 1-10 parts by weight, and the coating agent is used in an amount of 0.1-5 parts by weight, relative to 100 parts by weight of water; preferably, the bentonite is used in an amount of 3-5 parts by weight, the potassium chloride is used in an amount of 0.1-10 parts by weight, the alkalinity modifier is used in an amount of 0.1-1 parts by weight, the fluid-loss agent is used in an amount of 4-6 parts by weight, and the coating agent is used in an amount of 0.1-1 parts by weight, relative to 100 parts by weight of water.

According to the present disclosure, the alkalinity modifier is one or more selected from the group consisting of $Na_2CO_3$, NaOH and KOH, preferably $Na_2CO_3$ and/or NaOH.

According to the present disclosure, the fluid-loss agent is modified phenolic resin JD-6 and/or modified white asphalt WZD-1, wherein modified phenolic resin JD-6 is commercially available, it is a colloidal product obtained by polymerizing and sulfonating phenol, formaldehyde and sulfonic acid salts for several times under a certain condition, and the molecular structure contains benzene ring, methylene bridge and C—S bond, it is an high temperature resistance fluid-loss agent with strong thermal stability.

Wherein the modified white asphalt WZD-1 has the advantages of asphalt and its modified products, and eliminates the drawbacks of high toxicity and high fluorescence grades of the asphalt based products. The white asphalt is a product obtained by subjecting the fatty alcohol resin to a water-solubility processing, it can generate the emulsification influence with water and clay, form tenacity particles under different temperatures, block the microfractures of the formation and pores and cracks of the permeable stratum, thereby playing the roles of preventing collapse of formation and protecting the oil and gas reservoir.

According to the present disclosure, the coating agent is one or more selected from the group consisting of low-viscosity polyanionic cellulose PAC-LV, zwitterionic polymer FA367, low-viscosity carboxymethyl cellulose CMC-LV, preferably PAC-LV.

According to the present disclosure, PAC-LV is a water soluble cellulose ether derivative produced by chemically modifying natural cellulose, it is an important water soluble cellulose ether, which provides the slurry with desirable coating inhibition property, high temperature resistance, and can inhibition swelling of clay and shale in a medium with high salinity, thereby controlling pollution of the borehole wall.

In accordance with the present disclosure, the zwitterionic polymer FA367 introduces anionic groups, cationic groups and nonionic groups on the same molecular chain, the molecule contains cationic groups, thus exhibit desirable properties of preventing collapse and inhibiting hydration and dispersion of clay compared to the anionic multipolymer. A use of the product in the drilling fluids mainly serve to inhibit dispersion of rock debris and increasing viscosity of the drilling fluids, its coating inhibition capability is quite strong, and facilitates an increase of the mechanical drilling rate and protect the pay zone.

According to the present disclosure, the low-viscosity carboxymethyl cellulose CMC-LV is a carboxymethyl cellulose sodium product that can be used as a coating agent in a majority of the water-based drilling fluid systems, which include fresh water, sea water slurries, and has the resistance to a temperature of 121° C. Its function resides in effectively controlling the loss of water from fresh water and live sea water slurry filtrate with little viscosification; when the added amount is small, the CMC-LV can play a role of deflocculation.

According to the present disclosure, the contents of components are tightly controlled to facilitate interaction between the components, such that the prepared drilling fluid composition can provide the optimum performance during the drilling process, the produced drilling fluid has the characteristics while drilling with the basalt, such as obtaining the desirable plugging capability, optimizing the mud cake quality, preventing the filtrate from entering the stratum, increasing the pressure bearing capacity of the wellbore wall, protecting the reservoir stratum, and allowing the rheological property to be easily controlled.

According to the present disclosure, the method of preparing the water-based drilling fluid comprises the following steps:

(Z1) subjecting the desired amount of bentonite to a hydration treatment, adding desalinated water or tap water with a temperature of 60-80° C. or more to obtain a mixed liquid-1;

(Z2) adding a desired amount of sodium carbonate into the mixed liquid-1 obtained in step (Z1) and stirring the mixture, adjusting pH of the system with NaOH to 9-10, and performing pre-hydration for 24-36 h; preferably, adjusting pH to 10 and performing pre-hydration for 24 h to obtain a mixed liquid-2;

(Z3) adding the mixed liquid-2 obtained in step (Z2) with a desired amount of a coating agent, a fluid-loss agent, a plugging agent, a collapse-preventing agent, potassium chloride, and a weight agent sequentially in a state of stirring, and mixed uniformly to obtain a comprehensively plugging type water-based anti-collapse drilling fluid.

In accordance with the present disclosure, the bentonite is calcium-based bentonite, which shall be subjected to the pre-hydration treatment prior to formulation of the drilling fluid. The concrete method is to heat a certain amount of desalinated water or tap water to 80° C. or more, add bentonite in an amount of 4% of water and sufficiently stir the mixture until the bentonite is completely dispersed in water without agglomeration, add $Na_2CO_3$ in an amount of 5% of bentonite, adjust pH to of the mixture to 10 by using NaOH, stir for 2 h with the stirring speed within a range of 200 r/min to 600 r/min, and stand still for 24 h or more. The purpose of such a process is to improve the slurry-making capability of the calcium-based bentonite, so that the drilling fluid can obtain a desired flow pattern.

In a fourth aspect, the present disclosure provides a use of the aforementioned water-based drilling fluid in microfracture pores developed in basalt.

According to the present disclosure, the microfracture pores developed in basalt have a size between 20-80 μm.

The present disclosure will be described in detail below with reference to examples.

In the following examples and comparative examples:

The electronic balance with a precision of 0.0001 g was purchased from the Shanghai Tianping Instrument Factory;

The bentonite is Xinjiang Xiazijie Bentonite purchased from Xinjiang Nonmetallic Minerals Xiazijie Bentonite Co., Ltd.

The alkalinity modifier $Na_2CO_3$ and NaOH are commercially available from the Chengdu Kelong Chemical Reagent Factory;

The fluid-loss agent modified phenolic resin with a model number JD-6 is purchased from Chendu Xiyouhuawei Science & Technology Co. Ltd.;

The coating agent low viscosity polyanionic cellulose with a model number PAC-LV is purchased from Hebei Yanxing Chemical Co., Ltd.;

The micron plugging agent ultra-fine calcium carbonate powder with a model number XNZD is commercially available from Sichuan Southwest Shida Jinniu Petroleum Technology Co., Ltd.;

The nanographene with a model number CNT900 is purchased from the Beijing Deke Daojin Science and Technology Co. Ltd.;

The concentrated sulfuric acid and concentrated nitric acid are purchased from the Sinopharm Chemical Reagent Co. Ltd.;

The potassium chlorate is commercially available from the Beijing InnoChem Science and Technology Co. Ltd.;

The weighting agent barite with an article number 012 is purchased from Hebei Lingshou Yuyu Metallogenic Products Processing Co., Ltd.

Preparation Example 1

The preparation example served to illustrate the preparation process of the modified nanographene anti-collapsing agent of the present disclosure.

(1) 2.5 g nanographene was weighted, and added into 100 mL of mixed acid compounded with a concentrated sulfuric acid and a concentrated nitric acid in a volume ratio 1:1, the mixture was subjected to mixing and stirring in an ice-bath span for 20 min;

(2) 60 g potassium chlorate was taken and dropwise added into the mixed acid at a dropwise adding rate of 6 g/6 min, and the reaction was continuously carried out at room temperature of 20° C. for 96 h after natural melting of ice blocks in the ice-bath pan; the mixed liquid was repeatedly centrifuged by using deionized water to a neutral pH, the rotational speed of centrifugation was 12,000 r/min and the centrifugation time was 30 min; and subjected to an airtight ultrasonic exfoliation at a temperature of 80° C. and an ultrasonic frequency of 3.5 MHz for 60 min, to obtain a modified nanographene;

The prepared modified nanographene was measured with an average particle size of 60.4 nm, and diluted with water to obtain a slurry with a solid content of 10%, the obtained black liquid was exactly a modified nanographene slurry denoted as Z1.

Preparation Example 2

The preparation example served to illustrate the preparation process of the modified nanographene anti-collapsing agent of the present disclosure.

(1) 5 g nanographene was weighted, and added into 100 mL of mixed acid compounded with a concentrated sulfuric acid and a concentrated nitric acid in a volume ratio 1:2, the mixture was subjected to mixing and stirring in an ice-bath span for 20 min;

(2) 70 g potassium chlorate was taken and dropwise added into the mixed acid at a dropwise adding rate of 7 g/7 min, and the reaction was continuously carried out at room temperature of 20° C. for 96 h after natural melting of ice blocks in the ice-bath pan; the mixed liquid was repeatedly centrifuged by using deionized water to a neutral pH, the rotational speed of centrifugation was 12,000 r/min and the centrifugation time was 30 min; and subjected to an airtight ultrasonic exfoliation at a temperature of 80° C. and an ultrasonic frequency of 3.5 MHz for 60 min, to obtain a modified nanographene;

The prepared modified nanographene was measured with an average particle size of 66.8 nm, and diluted with water to obtain a slurry with a solid content of 10%, the obtained black liquid was exactly a modified nanographene slurry denoted as Z2.

Preparation Example 3

The preparation example served to illustrate the preparation process of the modified nanographene anti-collapsing agent of the present disclosure.

(1) 7.5 g nanographene was weighted, and added into 100 mL of mixed acid compounded with a concentrated sulfuric acid and a concentrated nitric acid in a volume ratio 1:3, the mixture was subjected to mixing and stirring in an ice-bath span for 20 min;

(2) 80 g potassium chlorate was taken and dropwise added into the mixed acid at a dropwise adding rate of 8 g/8 min, and the reaction was continuously carried out at room temperature of 20° C. for 96 h after natural melting of ice blocks in the ice-bath pan; the mixed liquid was repeatedly centrifuged by using deionized water to a neutral pH, the rotational speed of centrifugation was 12,000 r/min and the centrifugation time was 30 min; and subjected to an airtight ultrasonic exfoliation at a temperature of 80° C. and an ultrasonic frequency of 3.5 MHz for 60 min, to obtain a modified nanographene;

The prepared modified nanographene was measured with an average particle size of 100.2 nm, and diluted with water to obtain a slurry with a solid content of 10%, the obtained black liquid was exactly a modified nanographene slurry denoted as Z3.

Example 1

The Example served to illustrate the preparation process of the water-based drilling fluid of the present disclosure.

(S1) 100 parts by weight of tap water was taken and heated to 80° C., and uniformly added with 3 parts by weight of bentonite and stirred at an electric stirring rate of 600 r/min till the bentonite was sufficiently dispersed in water without agglomeration, to obtain a mixed liquid-1;

(S2) 0.15 parts by mass of $Na_2CO_3$ was added into the mixed liquid-1 obtained in the step (S1), NaOH was used for adjusting the pH to 10, the mixed liquid was stirred for 2 h, and subjected to stand still for 24 h, to obtain a mixed liquid-2;

(S3) the mixed liquid-2 obtained in step (S2) was added with 0.2 parts by weight of the coating agent PAC-LV and stirred at an electric stirring rate of 600 r/min for 10 min, and added with 4 parts by weight of a fluid-loss agent modified phenolic resin JD-6 and stirred for 10 min, then added 2.0 parts by weight of a micron plugging agent ultrafine calcium carbonate XNZD having an average particle size of 6.5 μm and stirred for 10 min, added with 2 parts by weight of an anti-collapse agent modified nanographene slurry denoted as Z1 prepared in the Preparation Example 1, and 2 parts by weight of potassium chloride was subsequently added and stirred with a high speed stirrer at a rotational speed of 6,000 r/min for 10 min, 120 parts by weight of a weighting agent barite having an average particle size of 12 μm was added and stirred at an electric stirring rate of 600 r/min for 10 min, the water-based drilling fluid was prepared.

The measurement results of High Temperature High Pressure (HTHP) filtrate loss of the water-based drilling fluids were shown in Table 1.

Example 2

The Example served to illustrate the preparation process of the water-based drilling fluid of the present disclosure.

(S1) 100 parts by weight of tap water was taken and heated to 80° C., and uniformly added with 4 parts by weight of bentonite and stirred at an electric stirring rate of 600 r/min till the bentonite was sufficiently dispersed in water without agglomeration, to obtain a mixed liquid-1;

(S2) 0.20 parts by mass of $Na_2CO_3$ was added into the mixed liquid-1 obtained in the step (S1), NaOH was used for adjusting the pH to 10, the mixed liquid was stirred for 2 h, and subjected to stand still for 24 h, to obtain a mixed liquid-2;

(S3) the mixed liquid-2 obtained in step (S2) was added with 0.3 parts by weight of the coating agent PAC-LV and stirred at an electric stirring rate of 600 r/min for 10 min, and added with 5 parts by weight of a fluid-loss agent modified phenolic resin JD-6 and stirred for 10 min, then added 2.0 parts by weight of a micron plugging agent ultrafine calcium carbonate XNZD having an average particle size of 6.5 μm and stirred for 10 min, added with 2.5 parts by weight of an anti-collapse agent modified nanographene slurry denoted as Z1 prepared in the Preparation Example 1, and 2.0 parts by weight of potassium chloride was subsequently added and stirred with a high speed stirrer at a rotational speed of 6,000 r/min for 10 min, 120 parts by weight of a weighting agent barite having an average particle size of 12 μm was added and stirred at an electric stirring rate of 600 r/min for 10 min, the water-based drilling fluid was prepared.

The measurement results of High Temperature High Pressure (HTHP) filtrate loss of the water-based drilling fluids were shown in Table 1.

Example 3

The Example served to illustrate the preparation process of the water-based drilling fluid of the present disclosure.

(S1) 100 parts by weight of tap water was taken and heated to 80° C., and uniformly added with 4 parts by weight of bentonite and stirred at an electric stirring rate of 600 r/min till the bentonite was sufficiently dispersed in water without agglomeration, to obtain a mixed liquid-1;

(S2) 0.20 parts by mass of $Na_2CO_3$ was added into the mixed liquid-1 obtained in the step (S1), NaOH was used for adjusting the pH to 10, the mixed liquid was stirred for 2 h, and subjected to stand still for 24 h, to obtain a mixed liquid-2;

(S3) the mixed liquid-2 obtained in step (S2) was added with 0.4 parts by weight of the coating agent PAC-LV and stirred at an electric stirring rate of 600 r/min for 10 min, and added with 5 parts by weight of a fluid-loss agent modified phenolic resin JD-6 and stirred for 10 min, then added 2.5 parts by weight of a micron plugging agent ultrafine calcium carbonate XNZD having an average particle size of 6.5 μm and stirred for 10 min, added with 3.0 parts by weight of an anti-collapse agent modified nanographene slurry denoted as Z1 prepared in the Preparation Example 1, and 2.0 parts by weight of potassium chloride was subsequently added and stirred with a high speed stirrer at a rotational speed of 6,000 r/min for 10 min, 130 parts by weight of a weighting agent barite having an average particle size of 12 μm was added and stirred at an electric stirring rate of 600 r/min for 10 min, the water-based drilling fluid was prepared.

The measurement results of High Temperature High Pressure (HTHP) filtrate loss of the water-based drilling fluids were shown in Table 1.

Example 4

The Example served to illustrate the preparation process of the water-based drilling fluid of the present disclosure.

(S1) 100 parts by weight of tap water was taken and heated to 80° C., and uniformly added with 4 parts by weight of bentonite and stirred at an electric stirring rate of 600 r/min till the bentonite was sufficiently dispersed in water without agglomeration, to obtain a mixed liquid-1;

(S2) 0.20 parts by mass of $Na_2CO_3$ was added into the mixed liquid-1 obtained in the step (S1), NaOH was used for adjusting the pH to 10, the mixed liquid was stirred for 2 h, and subjected to stand still for 24 h, to obtain a mixed liquid-2;

(S3) the mixed liquid-2 obtained in step (S2) was added with 0.4 parts by weight of the coating agent PAC-LV and stirred at an electric stirring rate of 600 r/min for 10 min, and added with 6 parts by weight of a fluid-loss agent modified phenolic resin JD-6 and stirred for 10 min, then added 2.5 parts by weight of a micron plugging agent ultrafine calcium carbonate XNZD and stirred for 10 min, added with 2 parts by weight of an anti-collapse agent modified nanographene slurry denoted as Z1 prepared in the Preparation Example 1, and 2.0 parts by weight of potassium chloride was subsequently added and stirred with a high speed stirrer at a rotational speed of 6,000 r/min for 10 min, 130 parts by weight of a weighting agent barite was added and stirred at an electric stirring rate of 600 r/min for 10 min, the water-based drilling fluid was prepared.

The measurement results of High Temperature High Pressure (HTHP) filtrate loss of the water-based drilling fluids were shown in Table 1.

Example 5

The Example served to illustrate the preparation process of the water-based drilling fluid of the present disclosure.

(S1) 100 parts by weight of tap water was taken and heated to 80° C., and uniformly added with 4 parts by weight of bentonite and stirred at an electric stirring rate of 600 r/min till the bentonite was sufficiently dispersed in water without agglomeration, to obtain a mixed liquid-1;

(S2) 0.20 parts by mass of $Na_2CO_3$ was added into the mixed liquid-1 obtained in the step (S1), NaOH was used for adjusting the pH to 10, the mixed liquid was stirred for 2 h, and subjected to stand still for 24 h, to obtain a mixed liquid-2;

(S3) the mixed liquid-2 obtained in step (S2) was added with 0.5 parts by weight of the coating agent PAC-LV and stirred at an electric stirring rate of 600 r/min for 10 min, and added with 6 parts by weight of a fluid-loss agent modified phenolic resin JD-6 and stirred for 10 min, then added 3.0 parts by weight of a micron plugging agent ultrafine calcium carbonate XNZD and stirred for 10 min, added with 4.0 parts by weight of an anti-collapse agent modified nanographene slurry denoted as Z1 prepared in the Preparation Example 1, and 2.0 parts by weight of potassium chloride was subsequently added and stirred with a high speed stirrer at a rotational speed of 6,000 r/min for 10 min, 130 parts by weight of a weighting agent barite was added and stirred at an electric stirring rate of 600 r/min for 10 min, the water-based drilling fluid was prepared.

The measurement results of High Temperature High Pressure (HTHP) filtrate loss of the water-based drilling fluids were shown in Table 1.

Example 6

The Example served to illustrate the preparation process of the water-based drilling fluid of the present disclosure.

The drilling fluid was prepared according to the same method as in Example 1, except that "an anti-collapse agent modified nanographene slurry denoted as Z1 prepared in the Preparation Example 1" used in Example 1 was replaced with "an anti-collapse agent modified nanographene slurry denoted as Z2 prepared in the Preparation Example 2".

The measurement results of High Temperature High Pressure (HTHP) filtrate loss of the water-based drilling fluids were shown in Table 1.

Example 7

The Example served to illustrate the preparation process of the water-based drilling fluid of the present disclosure.

The drilling fluid was prepared according to the same method as in Example 2, except that "an anti-collapse agent modified nanographene slurry denoted as Z1 prepared in the Preparation Example 1" used in Example 2 was replaced with "an anti-collapse agent modified nanographene slurry denoted as Z2 prepared in the Preparation Example 2".

The measurement results of High Temperature High Pressure (HTHP) filtrate loss of the water-based drilling fluids were shown in Table 1.

Example 8

The Example served to illustrate the preparation process of the water-based drilling fluid of the present disclosure.

The drilling fluid was prepared according to the same method as in Example 3, except that "an anti-collapse agent modified nanographene slurry denoted as Z1 prepared in the Preparation Example 1" used in Example 3 was replaced with "an anti-collapse agent modified nanographene slurry denoted as Z2 prepared in the Preparation Example 2".

The measurement results of High Temperature High Pressure (HTHP) filtrate loss of the water-based drilling fluids were shown in Table 1.

Example 9

The Example served to illustrate the preparation process of the water-based drilling fluid of the present disclosure.

The drilling fluid was prepared according to the same method as in Example 4, except that "an anti-collapse agent modified nanographene slurry denoted as Z1 prepared in the Preparation Example 1" used in Example 4 was replaced with "an anti-collapse agent modified nanographene slurry denoted as Z2 prepared in the Preparation Example 2".

The measurement results of High Temperature High Pressure (HTHP) filtrate loss of the water-based drilling fluids were shown in Table 1.

Example 10

The Example served to illustrate the preparation process of the water-based drilling fluid of the present disclosure.

The drilling fluid was prepared according to the same method as in Example 5, except that "an anti-collapse agent modified nanographene slurry denoted as Z1 prepared in the Preparation Example 1" used in Example 5 was replaced with "an anti-collapse agent modified nanographene slurry denoted as Z2 prepared in the Preparation Example 2".

The measurement results of High Temperature High Pressure (HTHP) filtrate loss of the water-based drilling fluids were shown in Table 1.

Example 11

The Example served to illustrate the preparation process of the water-based drilling fluid of the present disclosure.

The drilling fluid was prepared according to the same method as in Example 1, except that "an anti-collapse agent modified nanographene slurry denoted as Z1 prepared in the Preparation Example 1" used in Example 1 was replaced with "an anti-collapse agent modified nanographene slurry denoted as Z3 prepared in the Preparation Example 3".

The measurement results of High Temperature High Pressure (HTHP) filtrate loss of the water-based drilling fluids were shown in Table 1.

Example 12

The Example served to illustrate the preparation process of the water-based drilling fluid of the present disclosure.

The drilling fluid was prepared according to the same method as in Example 2, except that "an anti-collapse agent modified nanographene slurry denoted as Z1 prepared in the Preparation Example 1" used in Example 2 was replaced with "an anti-collapse agent modified nanographene slurry denoted as Z3 prepared in the Preparation Example 3".

The measurement results of High Temperature High Pressure (HTHP) filtrate loss of the water-based drilling fluids were shown in Table 1.

Example 13

The Example served to illustrate the preparation process of the water-based drilling fluid of the present disclosure.

The drilling fluid was prepared according to the same method as in Example 3, except that "an anti-collapse agent modified nanographene slurry denoted as Z1 prepared in the Preparation Example 1" used in Example 3 was replaced with "an anti-collapse agent modified nanographene slurry denoted as Z3 prepared in the Preparation Example 3".

The measurement results of High Temperature High Pressure (HTHP) filtrate loss of the water-based drilling fluids were shown in Table 1.

Example 14

The Example served to illustrate the preparation process of the water-based drilling fluid of the present disclosure.

The drilling fluid was prepared according to the same method as in Example 4, except that "an anti-collapse agent modified nanographene slurry denoted as Z1 prepared in the Preparation Example 1" used in Example 4 was replaced with "an anti-collapse agent modified nanographene slurry denoted as Z3 prepared in the Preparation Example 3".

The measurement results of High Temperature High Pressure (HTHP) filtrate loss of the water-based drilling fluids were shown in Table 1.

Example 15

The Example served to illustrate the preparation process of the water-based drilling fluid of the present disclosure.

The drilling fluid was prepared according to the same method as in Example 5, except that "an anti-collapse agent modified nanographene slurry denoted as Z1 prepared in the Preparation Example 1" used in Example 5 was replaced with "an anti-collapse agent modified nanographene slurry denoted as Z3 prepared in the Preparation Example 3".

The measurement results of High Temperature High Pressure (HTHP) filtrate loss of the water-based drilling fluids were shown in Table 1.

Comparative Example 1

The drilling fluid was prepared according to the same method as in Example 1, except that "the modified nanographene having an average particle size of 60.4 nm prepared in the Preparation Example 1" was modified into "the modified nanographene having an average particle size of 330 nm".

The measurement results of High Temperature High Pressure (HTHP) filtrate loss of the water-based drilling fluids were shown in Table 1.

Comparative Example 2

The drilling fluid was prepared according to the same method as in Example 1, except that "the modified nanographene having an average particle size of 60.4 nm prepared in the Preparation Example 1" was modified into "the modified nanographene was not added".

The measurement results of High Temperature High Pressure (HTHP) filtrate loss of the water-based drilling fluids were shown in Table 1.

Comparative Example 3

The drilling fluid was prepared according to the same method as in Example 1, except that "2 parts by weight of an anti-collapse agent modified nanographene slurry prepared in the Preparation Example 1" was modified into "0.5 parts by weight of an anti-collapse agent modified nanographene slurry prepared in the Preparation Example 1".

The measurement results of High Temperature High Pressure (HTHP) filtrate loss of the water-based drilling fluids were shown in Table 1.

Comparative Example 4

The drilling fluid was prepared according to the same method as in Example 1, except that "a micron plugging agent ultrafine calcium carbonate XNZD having an average particle size of 6.5 μm" was modified into "a micron plugging agent ultrafine calcium carbonate XNZD having an average particle size of 19 μm".

The measurement results of High Temperature High Pressure (HTHP) filtrate loss of the water-based drilling fluids were shown in Table 1.

Comparative Example 5

The drilling fluid was prepared according to the same method as in Example 1, except that "a weighting agent barite having an average particle size of 12 μm" was modified into "the used weighting agent barite powder having an average particle size of 45 μm".

The measurement results of High Temperature High Pressure (HTHP) filtrate loss of the water-based drilling fluids were shown in Table 1.

Comparative Example 6

The drilling fluid was prepared according to the same method as in Example 1, except that in the step (S3), the mixed liquid 2 obtained in step (S2) added with 2 parts by weight of a fluid-loss agent modified phenolic resin JD-6 and stirred at an electric stirring rate of 600 r/min for 10 min, then added 1.5 parts by weight of a micron plugging agent ultrafine calcium carbonate XNZD having an average particle size of 6.5 μm and stirred for 10 min, and added with 0.5 parts by weight of the coating agent PAC-LV and stirred for 10 min, added with 0.5 parts by weight of an anticollapse agent modified nanographene slurry denoted as Z1 prepared in the Preparation Example 1, and subsequently stirred with a high speed stirrer at a rotational speed of 6,000 r/min for 10 min, 50 parts by weight of a weighting agent barite having an average particle size of 12 μm was added and stirred at an electric stirring rate of 600 r/min for 10 min, the water-based drilling fluid was prepared.

The measurement results of High Temperature High Pressure (HTHP) filtrate loss of the water-based drilling fluids were shown in Table 1.

Comparative Example 7

The drilling fluid was prepared according to the same method as in Example 1, except that the modified nanographene slurry prepared in the Preparation Example 2 was used, however, the modified nanographene slurry had a solid content of 20% (solid content of 20% referred to that the water is used as the dispersing agent, and the mass of said solid-phase modified nanographene was 20% of the total mass) and an average particle size of 129 nm.

The measurement results of High Temperature High Pressure (HTHP) filtrate loss of the water-based drilling fluids were shown in Table 1.

Comparative Example 8

The drilling fluid was prepared according to the same method as in Example 5, except that the modified nanographene slurry prepared in the Preparation Example 3 was used, however, the modified nanographene slurry had a solid content of 20% and an average particle size of 201 nm.

The measurement results of High Temperature High Pressure (HTHP) filtrate loss of the water-based drilling fluids were shown in Table 1.

Comparative Example 9

The drilling fluid was prepared according to the same method as in Example 5, except that 0.4 parts by weight of the modified nanographene slurry prepared in the Preparation Example 1 was added, but the modified nanographene slurry was the modified nanographene dry material, which meaning that the modified nanographene was in a solid powder state and was not disperse into water to form a slurry.

The measurement results of High Temperature High Pressure (HTHP) filtrate loss of the water-based drilling fluids were shown in Table 1.

Comparative Example 10

The drilling fluid was prepared according to the same method as in Example 5, except that 0.4 parts by weight of the modified nanographene slurry prepared in the Preparation Example 1 was added, but the modified nanographene slurry was the dry material of nanometer oxidized graphene.

The measurement results of High Temperature High Pressure (HTHP) filtrate loss of the water-based drilling fluids were shown in Table 1.

Comparative Example 11

The drilling fluid was prepared according to the same method as in Example 5, except that 0.4 parts by weight of the modified nanographene slurry prepared in the Preparation Example 3 was added, but the modified nanographene slurry was the dry material of nanometer oxidized graphene.

The measurement results of High Temperature High Pressure (HTHP) filtrate loss of the water-based drilling fluids were shown in Table 1.

Test Example 1

A suitable amount of the drilling fluids prepared in the Examples 1-15 and Comparative Examples 1-11 was taken respectively, the high-temperature and high-pressure fluid loss meter was used for testing the high-temperature and high-pressure fluid loss and measuring the thickness of mud cake, thereby reflecting the fluid loss level of the drilling fluid and the quality of mud cake.

TABLE 1

| Numbers | Initial fluid loss (mL) | Total fluid loss (mL) | Thickness of mud cake (mm) |
|---|---|---|---|
| Example 1 | 2.3 | 12.0 | 4.2 |
| Example 2 | 2.2 | 10.8 | 4.0 |
| Example 3 | 1.8 | 10.2 | 3.4 |
| Example 4 | 1.6 | 10.0 | 3.5 |
| Example 5 | 1.6 | 10.2 | 3.5 |
| Example 6 | 2.0 | 11.8 | 4.0 |
| Example 7 | 2.0 | 11.8 | 3.8 |
| Example 8 | 1.8 | 11.1 | 3.4 |
| Example 9 | 1.6 | 9.8 | 3.4 |
| Example 10 | 1.4 | 9.0 | 2.9 |

TABLE 1-continued

| Numbers | Initial fluid loss (mL) | Total fluid loss (mL) | Thickness of mud cake (mm) |
| --- | --- | --- | --- |
| Example 11 | 2.5 | 13.1 | 4.4 |
| Example 12 | 2.4 | 12.8 | 4.4 |
| Example 13 | 2.4 | 13.2 | 4.4 |
| Example 14 | 2.4 | 13.2 | 4.5 |
| Example 15 | 2.5 | 13.6 | 4.6 |
| Comparative Example 1 | 2.6 | 14.0 | 4.4 |
| Comparative Example 2 | 3.2 | 15.4 | 4.6 |
| Comparative Example 3 | 2.8 | 16.0 | 4.6 |
| Comparative Example 4 | 2.6 | 15.6 | 4.2 |
| Comparative Example 5 | 2.5 | 14.0 | 4.8 |
| Comparative Example 6 | 3.0 | 17.6 | 5.5 |
| Comparative Example 7 | 1.8 | 13.9 | 4.4 |
| Comparative Example 8 | 2.0 | 13.8 | 4.4 |
| Comparative Example 9 | 2.1 | 14.2 | 4.4 |
| Comparative Example 10 | 2.2 | 14.2 | 4.3 |
| Comparative Example 11 | 2.4 | 14.6 | 4.5 |

The experimental principle meets the application conditions of the Darcy-Weisbach Formula $K=q \cdot l \cdot \mu/(A \cdot \Delta p)$.

Where K is the permeability of the porous medium, the more completely the pores in the medium are plugged, the poorer the ability of the fluid passes through, indicating that the lower is the value of the permeability K; the medium in the experiment is the mud cake;

where q is the flow rate passing through the medium under a pressure differential, the flow rate in the experiment is the fluid loss;

where l refers to the length of said medium, i.e. the thickness of mud cake in the experiment;

where u refers to the viscosity of fluid passing through the medium, the fluid in the experiment refers to the drilling fluid in the present disclosure;

where A denotes the cross-sectional area of the medium along the flow direction, the cross-sectional area in the experiment is the perfect circle surface area of the mud cake;

$\Delta P$ refers to the pressure difference before and after the fluid passes through the medium, it refers to the test pressure difference for high temperature and pressure fluid loss in the experiment.

According to the experimental principle, each of the parameters u, A, $\Delta P$ in the formula is a definite value and can be used as a constant term, the permeability K of said mud cake, which can reflect the plugging degree, merely vary along with the fluid loss q and the thickness l of said mud cake.

As can be seen from the data in Table 1:

The drilling fluids of Examples 1-15 had a High Temperature High Pressure (HTHP) filtrate loss within a range of 9.0-13.6 mL and a mud cake thickness between 2.9-4.6 mm, it demonstrated that when drilling a formation of basalt with micro-nano fractures, the particles having a large average particle size initial bridged to reduce the size of pores and cracks, the micron plugging agent XNZD having a small average particle size subsequently filled to reduce size of pores and cracks of basalt, until the fill of the last level of nanometer anti-collapse agent was complete, thereby comprehensively plugging the various micro-nano pores and cracks of the borehole wall; in addition, each of the drilling fluids formulated with the suitable ingredients and the contents thereof fell into the defined scopes exhibited the excellent property of fabricating walls with filtrate loss, and formed a thin and dense mud cake on the walls, reduced invasion of solid phase and liquid phase of said drilling fluid into the stratum and its damage to the oil and gas reservoir.

The amount of initial fluid loss may reflect a capability of the drilling fluid to form a dense mud cake instantaneously under the influence of a positive pressure differential. The lower was the initial fluid loss, indicating a thinner and denser mud cake was formed instantaneously and the quality of mud cake was better. The lower was the total fluid loss, indicating a lower permeability of mud cake, and therefore a stronger plugging ability of the drilling fluid. In the Example 10, the initial fluid loss was only 1.4 mL and the total fluid loss was merely 9.0 mL, it demonstrated the best plugging effect among the Examples. The lower were the values of initial fluid loss and total fluid loss in the experiment, the smaller was the mud cake thickness, indicating that the better was the plugging effect.

The modified nanographene having an average particle size of 330 nm was added in Comparative Example 1, the fluid loss was 14 mL, and the mud cake thickness was 4.4 mm, it had large influence on the plugging effect of said drilling fluid.

The modified nanographene was not added in Comparative Example 2, the fluid loss was 15.4 mL, and the mud cake thickness was 4.6 mm, it had large influence on the plugging effect of said drilling fluid.

0.5 parts by weight of the modified nanographene slurry anti-collapse agent were added in Comparative Example 3, it can be derived from the experiment that the added amount of 0.5 parts by weight was not favorable to the plugging and anti-collapse effects of the drilling fluid.

In Comparative Example 4, the micron plugging agent had an average particle size of 19 μm, its plugging effect was inferior to the plugging agent having an average particle size of 6.5 μm.

The weighting agent in Comparative Example 5 was replaced with barite having an average particle size of 45 μm, the fluid loss was 14 mL, and the mud cake thickness was 4.8 mm, it demonstrated that the barite particles having an excessively large average particle size exhibited a poor matching with the average particle size distribution of the drilling fluid of the present disclosure, and imposed a large impact on the plugging performance.

As compared with the performance of the drilling fluids in Examples 1-15, the concentration of the nanometer anti-collapse agent in Comparative Examples 6-8 was raised to 20%, the fluid loss and mud cake thickness were increased accordingly, indicating that the nanometer anti-collapse agent with a high concentration may adversely affect the plugging and anti-collapse property of the drilling fluids, and the performance of drilling fluids formulated with ingredients having their contents within the defined scopes was desirable.

Compared to the performance of the drilling fluids of Examples 1-15, the effects of adding a dry material of nanometer anti-collapse agent into the drilling fluids in the Comparative Examples 9-11 were far inferior to those of adding a slurry with a concentration of 10% obtained by dispersing the dry material into water, it demonstrated that an increased concentration of said nanometer anti-collapse agent adversely affected the dispersion effect of said graphene, thereby affecting the average particle size distribution of said system and producing negative influence on the plugging and anti-collapse performance of the drilling fluids.

To sum up, the present disclosure provided a water-based drilling fluid suitable for comprehensively plugging of the basalt formations, the water-based drilling fluid had desirable property of fabricating wall with filtrate loss through synergy of the plugging and anti-collapse materials having different average particle sizes, and can form a thin and dense mud cake, effectively plugged micro-nano cracks of basalt, and prevented penetration of the drilling fluid filtrate through the permeable pores and cracks. The borehole stress was enhanced to prevent collapse of borehole wall and sticking of drilling tool during a process of drilling the basalt formations, thereby saving the engineering costs.

Test Example 2

500 mL of the drilling fluids prepared in Examples 1-15 and Comparative Examples 1-11 were respectively taken for use, a visual sand bed filtrate loss gauge was used, 100 cm$^3$ of 75 mesh quartz sand, 100 cm$^3$ of 225 mesh quartz sand, 100 cm$^3$ of 375 mesh quartz sand and 800 mesh quartz sand were taken and stirred uniformly, the mixture was poured into a cylindrical and transparent drilling fluid cup to simulate a shale heterogeneous porous stratum, 500 cm$^3$ of the prepared drilling fluid was subsequently poured and the cup cover was tightened, an air source was connected and the pressure was adjusted to 0.69 MPa, a vent valve was opened, the air source was introduced into the drilling fluid cup, further simulating the state that the drilling fluid was extruded and seeped into a borehole wall under a well, the invasion depth of the drilling fluid through the cup body was simultaneously observed and recorded. The test results were shown in Table 2.

TABLE 2

| Numbers | Penetration depth at 7.5 min (cm) | Penetration depth at 30 min (cm) | Penetration amount at 30 min (mL) |
| --- | --- | --- | --- |
| Example 1 | 1.4 | 3.9 | 24 |
| Example 2 | 1.4 | 3.6 | 22.5 |
| Example 3 | 1.1 | 3.1 | 19 |
| Example 4 | 1.1 | 2.8 | 18 |
| Example 5 | 1.3 | 2.8 | 18 |
| Example 6 | 1.6 | 3.4 | 22.5 |
| Example 7 | 1.5 | 3.4 | 22 |
| Example 8 | 1.2 | 2.7 | 17.5 |
| Example 9 | 1.2 | 2.8 | 18 |
| Example 10 | 1.0 | 2.5 | 15.5 |
| Example 11 | 1.5 | 3.8 | 24 |
| Example 12 | 1.6 | 3.8 | 24.5 |
| Example 13 | 1.5 | 4.0 | 25 |
| Example 14 | 1.6 | 4.1 | 24.5 |
| Example 15 | 1.6 | 4.2 | 24.5 |
| Comparative Example 1 | 1.8 | 4.3 | 27.5 |
| Comparative Example 2 | 2.3 | 5.5 | 35 |
| Comparative Example 3 | 1.9 | 4.9 | 30.5 |
| Comparative Example 4 | 1.8 | 4.3 | 27.5 |
| Comparative Example 5 | 1.7 | 4.4 | 27.5 |
| Comparative Example 6 | 2.5 | 5.3 | 35 |
| Comparative Example 7 | 1.8 | 4.3 | 27.5 |
| Comparative Example 8 | 1.9 | 4.4 | 28.5 |
| Comparative Example 9 | 1.8 | 4.2 | 27 |
| Comparative Example 10 | 2.2 | 5.0 | 32.5 |
| Comparative Example 11 | 2.1 | 4.9 | 31.5 |

The conclusion of Test Example 1 can also be verified from the data in Table 2, the penetration depth at 30 min of drilling fluids was between 15.5-25.0 mL in Examples 1-15, wherein the penetration amount was only 15.5 mL in Example 10, and the penetration depth of drilling fluids in Comparative Examples 1-11 was all higher than 25 mL, it demonstrated that the drilling fluids of the present disclosure had desirable plugging performance.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A method of preparing a modified nanographene slurry anti-collapse agent, including:
    (1) subjecting a nanographene and a mixed acid to a first contact to obtain a mixed liquid; wherein the mixed acid comprises a compound of concentrated sulfuric acid and concentrated nitric acid, and a mass ratio of the concentrated sulfuric acid to the concentrated nitric acid is (1-2):(2-5);
    (2) dropwise adding potassium chlorate at a rate of 5-10 g/5-10 min into the mixed liquid of step (1) under the condition of ice-bath pan to carry out a modification treatment, so as to obtain a modified nanographene, wherein the potassium chlorate is used in an amount of 50-100 g relative to 100 mL of the mixed acid; and
    (3) subjecting the modified nanographene of step (2) to a second contact with water to prepare a modified nanographene slurry;
    wherein the modified nanographene slurry is a black liquid;
    wherein the modified nanographene slurry comprises the modified nanographene and water, said modified nanographene being contained in an amount of 10-15 g relative to 100 mL of the water; and
    wherein the modified nanographene has an average particle size of 40-100 nm.

2. The method of claim 1, wherein the nanographene is contained in an amount of 1-10 g relative to 100 mL of the mixed acid.

3. The method of claim 1, wherein a condition of the modification treatment comprises a temperature of 10-35° C. and a time of 80-110 hours.

4. The method of claim 1, wherein the method further including: subjecting the modified nanographene obtained in step (2) to centrifugation and washing to neutral, and subjecting to an airtight ultrasonic dispersion exfoliation treatment.

5. The method of claim 4, wherein a condition of the centrifugation comprises a centrifugation rotational speed of 5,000 r/min to 20,000 r/min and a time of 20-40 min.

6. The method of claim 4, wherein a condition of the airtight ultrasonic dispersion exfoliation comprises a temperature of 60-100° C., an ultrasonic frequency of 3-4 MHz, and an ultrasonic time of 40-80 min.

* * * * *